US011588882B2

United States Patent
Liu et al.

(10) Patent No.: US 11,588,882 B2
(45) Date of Patent: Feb. 21, 2023

(54) METHOD, ELECTRONIC DEVICE, AND COMPUTER PROGRAM PRODUCT FOR APPLICATION MIGRATION

(71) Applicant: EMC IP Holding Company LLC, Hopkinton, MA (US)

(72) Inventors: Jinpeng Liu, Shanghai (CN); Jin Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 17/134,778

(22) Filed: Dec. 28, 2020

(65) Prior Publication Data

US 2022/0174110 A1    Jun. 2, 2022

(30) Foreign Application Priority Data

Nov. 30, 2020   (CN) .......................... 202011379201

(51) Int. Cl.
*H04L 67/10*    (2022.01)
*H04W 4/029*    (2018.01)
*H04W 4/20*    (2018.01)

(52) U.S. Cl.
CPC ............. *H04L 67/10* (2013.01); *H04W 4/029* (2018.02); *H04W 4/20* (2013.01)

(58) Field of Classification Search
CPC ........ H04L 67/10; H04L 67/34; H04W 4/029; H04W 4/20; H04W 4/00; H04W 36/32; G06F 8/76
See application file for complete search history.

(56) References Cited

U.S. PATENT DOCUMENTS

2015/0358881 A1 * 12/2015 Cui ..................... H04W 24/02
                                                        455/436
2019/0324810 A1    10/2019 Zhao et al.
(Continued)

FOREIGN PATENT DOCUMENTS

| CN | 108882293 A | * | 11/2018 | ............ H04W 24/10 |
| WO | WO-2012013090 A1 | * | 2/2012 | ............ H04L 5/001 |
| WO | WO-2020164355 A1 | * | 8/2020 | ............ H04W 24/08 |

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.
(Continued)

*Primary Examiner* — Benjamin M Thieu
(74) *Attorney, Agent, or Firm* — Ryan, Mason & Lewis, LLP (57) ABSTRACT

Embodiments of the present disclosure relate to a method, an electronic device, and a computer program product for application migration. The method includes determining an application used by a terminal device if it is determined that the terminal device moves from a first cell provided by a first network device to a second cell provided by a second network device. The method also includes determining a migration strategy for the application, the migration strategy describing the migration of components of the application in a predetermined scenario corresponding to the application. The method also includes determining migration information of components in an initial edge node associated with the first network device to a target edge node associated with the second network device based on the migration strategy, the migration information at least indicating whether the components in the initial edge node are to be migrated to the target edge node.

20 Claims, 6 Drawing Sheets

(56) References Cited

U.S. PATENT DOCUMENTS

2020/0334083 A1 10/2020 Liu et al.
2020/0334544 A1 10/2020 Liu et al.

OTHER PUBLICATIONS

Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901.02067v1, Jan. 7, 2019, 13 pages.
Github, "OpenNESS Architecture and Solution Overview," https://github.com/open-ness/specs/blob/master/doc/architecture.md, accessed Jul. 7, 2020, 15 pages.
Amazon Web Services, "Machine Learning Inference with AWS IoT Greengrass Solution Accelerator" https://aws.amazon.com/iot/solutions/mli-accelerator/, Oct. 2019, 5 pages.
ETSI, "MEC in 5G Networks," White Paper No. 28, ISBN No. 979-10-92620-22-1, Jun. 2018, 28 pages.
ETSI, "Multi-access Edge Computing (MEC); Phase 2: Use Cases and Requirements," Group Specification MEC 002 V2.1.1, Oct. 2018, 66 pages.
ETSI, "Multi-access Edge Computing (MEC); Framework and Reference Architecture," Group Specification MEC 003 V2.1.1, Jan. 2019, 21 pages.
ETSI, "Multi-access Edge Computing (MEC); Application Mobility Service API," Group Specification MEC 021 V2.1.1, Jan. 2020, 47 pages.
3GPP "3rd Generation Partnership Project; Technical Specification Group Core Network and Terminals; Interface between the Control Plane and the User Plane Nodes; Stage 3," Technical Specification 29.244 V16.2.0, Dec. 2019, 281 pages.
3GPP "3rd Generation Partnership Project; Technical Specification Group Services and System Aspects; System architecture for the 5G System (5GS); Stage 2," Technical Specification 23.501 V16.3.0, Dec. 2019, 417 pages.
3GPP "3rd Generation Partnership Project; Technical Specification Group Services and System Aspects; Procedures for the 5G System (5GS); Stage 2," Technical Specification 23.502 V16.3.0, Dec. 2019, 558 pages.
3GPP "3rd Generation Partnership Project; Technical Specification Group Core Network and Terminals; 5G System Session Management Policy Control Service; Stage 3," Technical Specification 29.512 V16.3.0, Dec. 2019, 178 pages.
3GPP "3rd Generation Partnership Project; Technical Specification Group Core Network and Terminals; 5G System Network Exposure Function Northbound APIs; Stage 3," Technical Specification 29.522 V16.2.0, Dec. 2019, 106 pages.
U.S. Appl. No. 16/540,385 filed in the name of Jinpeng Liu et al., filed Aug. 14, 2019, and entitled "Method, a Device and a Computer Program Product for Determining a Resource Required for Executing a Code Segment."
U.S. Appl. No. 16/542,757 filed in the name of Jinpeng Liu et al., filed Aug. 16, 2019, and entitled "Method, Device and Computer Program Product for Processing Machine Learning Model."
U.S. Appl. No. 16/678,758 filed in the name of Jinpeng Liu et al., filed Nov. 8, 2019, and entitled "Method, Electronic Device and Computer Program Product for Processing Machine Learning Model."
U.S. Appl. No. 16/789,006 filed in the name of Jin Li et al., filed Feb. 12, 2020, and entitled "Scheduling Artificial Intelligence Model Partitions Based on Reversed Computation Graph."
U.S. Appl. No. 16/823,445 filed in the name of Jinpeng Liu et al., filed Mar. 19, 2020, and entitled "Task Scheduling Method, Electronic Device, and Computer Storage Medium."
U.S. Appl. No. 16/845,682 filed in the name of Jin Li et al., filed Apr. 10, 2020, and entitled "Task Processing Method, Electronic Device, and Computer Program Product."
U.S. Appl. No. 16/925,864 filed in the name of Jinpeng Liu et al., filed Jul. 10, 2020, and entitled "Managing Artificial Intelligence Model Partitions for Edge Computing Environment."
U.S. Appl. No. 17/105,030 filed in the name of Jinpeng Liu et al., filed Nov. 25, 2020, and entitled "Method, System and Computer Program Product for Deploying Application."

* cited by examiner

METHOD, ELECTRONIC DEVICE, AND COMPUTER PROGRAM PRODUCT FOR APPLICATION MIGRATION

RELATED APPLICATION(S)

The present application claims priority to Chinese Patent Application No. 202011379201.9, filed Nov. 30, 2020, and entitled "Method, Electronic Device, and Computer Program Product for Application Migration," which is incorporated by reference herein in its entirety.

FIELD

Embodiments of the present disclosure relate to the field of edge computing, and in particular, to a method, an electronic device, and a computer program product for application migration.

BACKGROUND

Edge computing is the evolution of cloud computing, which migrates the deployment of applications from a centralized data center downward to distributed edge nodes, thereby achieving shorter distances from data generated by consumers and the applications. Edge computing is considered as one of the important technologies for meeting 5G key performance indicators (especially in terms of low delays and bandwidth efficiency). A 3GPP 5G system specification allows a multi-access edge computing (MEC) system and a 5G system to cooperate in operations related to traffic directing and policy control. The MEC system may be integrated with the 5G system to create a powerful environment for edge computing. In a system architecture where the 5G system and the MEC system are integrally deployed, a data plane of a 5G core network may be implemented by a user plane function network element (UPF) inside the MEC system.

SUMMARY

Illustrative embodiments of the present disclosure provide a method, an electronic device, and a computer program product for application migration.

According to a first aspect of the present disclosure, a method for application migration is provided. The method includes determining an application used by a terminal device if it is determined that the terminal device moves from a first cell provided by a first network device to a second cell provided by a second network device. The method also includes determining a migration strategy for the application, the migration strategy describing the migration of components of the application in a predetermined scenario corresponding to the application. The method also includes determining migration information of components in an initial edge node associated with the first network device to a target edge node associated with the second network device based on the migration strategy, the migration information at least indicating whether the components in the initial edge node are to be migrated to the target edge node.

According to a second aspect of the present disclosure, an electronic device is provided. The electronic device includes: at least one processor; and a memory coupled to the at least one processor and having instructions stored thereon. When executed by the at least one processor, the instructions cause the device to perform actions including: determining an application used by a terminal device if it is determined that the terminal device moves from a first cell provided by a first network device to a second cell provided by a second network device; determining a migration strategy for the application, the migration strategy describing the migration of components of the application in a predetermined scenario corresponding to the application; and determining migration information of components in an initial edge node associated with the first network device to a target edge node associated with the second network device based on the migration strategy, the migration information at least indicating whether the components in the initial edge node are to be migrated to the target edge node.

According to a third aspect of the present disclosure, a computer program product is provided. The computer program product is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent from the description below of example embodiments of the present disclosure, to be viewed in conjunction with the accompanying drawings. In the example embodiments of the present disclosure, the same reference numerals generally represent the same parts.

The same or corresponding reference numerals in the various drawings represent the same or corresponding portions.

DETAILED DESCRIPTION

Embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the illustrative embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the illustrative embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or the same objects. Other explicit and implicit definitions may also be included below.

The principles of the present disclosure will be described below with reference to several example embodiments shown in the accompanying drawings. Although illustrative embodiments of the present disclosure are shown in the accompanying drawings, it should be understood that these embodiments are described only to enable those skilled in the art to better understand and then implement the present disclosure, and are not intended to impose any limitation to the scope of the present disclosure.

As mentioned above, a 3GPP 5G system specification allows an integrated deployment of an MEC system and a 5G system. For example, the MEC system and its local UPF may be co-located with a base station, co-located with a transmission node, co-located with a network sink node, or co-located with a core network function network element. In these deployment modes, an application is usually deployed in one or more physical edge nodes such as an MEC node.

For model parallel applications, schedulers, input node executors, and computing node executors of these applications are usually located in different edge nodes. For example, the input node executor may be arranged in an edge node co-located with a base station, and the scheduler and the computing node executor may be arranged in an edge node co-located with a data center.

These applications usually serve terminal devices of one or more users. When a user's terminal device enters a cell provided by a base station from a cell provided by another network device, such as a cell provided by another base station, it may be necessary to migrate an application from one edge node to another edge node. For ease of description, one edge node is referred to as an initial edge node, and another edge node is referred to as a target edge node. In some cases, this often requires at least the following operations: reallocating resources for an application on the target edge node, starting a new application instance on the target edge node, synchronizing the state between an old instance and the new instance of the application so as to continue the application services suspended on an original edge node, and recycling resources occupied by the old instance from the original edge node. For applications with high real-time requirements, such as automatic driving, a long service interruption time caused by the above migration process may be unacceptable.

In addition, since the target edge node may have already run different instances or parts of instances of the application, the overall migration of the application at this moment leads to the acquisition of duplicate data, which wastes network resources and computing resources.

In order to at least solve the above and other potential problems, an embodiment of the present disclosure provides a method for application migration. In the method, an application used by a terminal device is determined if it is determined that the terminal device moves from a first cell provided by a first network device to a second cell provided by a second network device. Then, a migration strategy of the application is determined, and migration information of components in an initial edge node associated with the first network device to a target edge node associated with the second network device is determined using the migration strategy. The migration information at least indicates whether the components in the initial edge node are to be migrated to the target edge node. Through the method, the efficiency of application migration can be improved, the use of network resources and computing resources can be reduced, and data processing efficiency and user experience can be improved.

Figure 1:
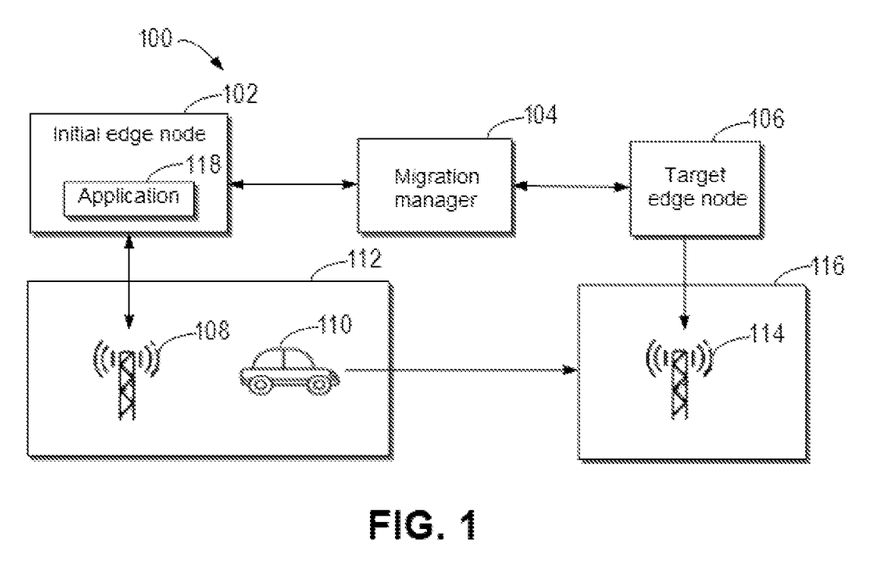
FIG. 1 illustrates a schematic diagram of example system 100 where a device and/or a method according to an embodiment of the present disclosure may be implemented.

Illustrative embodiments of the present disclosure will be further described below in detail with reference to the accompanying drawings. FIG. 1 shows a block diagram of example system 100 in which an embodiment of the present disclosure can be implemented. It should be understood that the structure of system 100 is described for illustrative purposes only and does not imply any limitation to the scope of the present disclosure.

As shown in FIG. 1, system 100 includes terminal device 110, network devices 108 and 114, initial edge node 102 associated with network device 108, target edge node 106 associated with network device 114, and migration manager 104 for managing the migration of an application from initial edge node 102 to target edge node 106.

Terminal device 110 may be any terminal having wired or wireless communication functions, and may also be user equipment (UE), including, but not limited to, mobile phones, computers, personal digital assistants, game consoles, wearable devices, in-vehicle communication devices, machine type communication (MTC) devices, device-to-device (D2D) communication devices, vehicle-to-everything (V2X) communication devices, sensors, etc. The terminal device can be used interchangeably with UE, a mobile station, a subscriber station, a mobile terminal, a user terminal, or a wireless device.

Network device 108 and network device 114 may be network nodes, for example, a Node B (Node B or NB), an evolved Node B (eNodeB or eNB), a next-generation Node B (gNB), a basic transceiver station (BTS), a base station (BS), a base station subsystem (BSS), or the like. For ease of description, network device 108 is referred to as a first network device, and network device 114 is referred to as a second network device.

In some embodiments, initial edge node 102 is one or more edge nodes co-located with network device 108 and a regional data center connected to network device 108, such as an MEC node. The target edge node is one or more edge nodes co-located with network device 114 and a regional data center connected to network device 114, such as an MEC node.

In some embodiments, the regional data center connected to network device 108 and the regional data center connected to network device 114 are the same regional data center. Therefore, the edge node co-located with network device 108 and the edge node co-located with network device 114 are connected to the same edge node co-located with the same regional data center. In some embodiments, the regional data center connected to network device 108 and the regional data center connected to network device 114 are different regional data centers. Therefore, the edge node co-located with network device 108 and the edge node co-located with network device 114 are respectively connected to different edge nodes co-located with different regional data centers. The above examples are only for describing the present disclosure, rather than specifically limiting the present disclosure.

FIG. 1 shows system 100 including two network devices 108 and 114, which are only an example, rather than a specific limitation on the present disclosure. System 100 may include any number of network devices and edge nodes associated with the network devices.

Application 118 used by terminal device 110 runs on initial edge node 102. Application 118 is a model parallel application. Therefore, a computational graph of application 118 includes an input node, a computing node, and an output node. These nodes may be arranged in different initial edge nodes in initial edge node 102. For example, since the input node is only for inputting data and does not need to occupy too many computing resources, the input node may be arranged on the initial edge node co-located with network device 108. Since the computing node needs to use a large number of computing resources, it may be arranged on the initial edge node co-located with the regional data center connected to network device 108.

In some embodiments, the data output by application 118 is used by a user, and the output node of the application may be arranged on the initial edge node co-located with network device 108. In some embodiments, the data output by application 118 is for a server in a network, and then the output node may be arranged on the initial edge node co-located with the regional data center. The deployment of the output node is similar to that of the input node or the computing node. Therefore, the output node may be described as the input node and the computing node.

Application 118 includes a node scheduler, an input node executor, and a computing node executor. Application 118 uses the input node executor to execute the function of the input node, and the computing node executor executes the function of the computing node. The node scheduler controls the execution of the input node and the output node.

Migration manager 104 is used to manage the migration of application 118. When terminal device 110 using application 118 moves from first cell 112 served by network device 108 to second cell 116 served by network device 114, migration manager 104 determines, according to a migration strategy corresponding to application 118, migration information of components of the application running in initial edge node 102 to target edge node 106. The migration information at least indicates whether the components in initial edge node 102 are to be migrated to target edge node 106.

For different predetermined scenarios, the migration information may indicate the migration or non-migration of part or all of the node scheduler, the input node executor, and the computing node executor. If some components need to be migrated, migration manager 104 migrates the to-be-migrated components indicated in the migration information to target edge node 106.

Migration manager 104, initial edge node 102, and target edge node 106 may be implemented using any device with a computing function, and comply with the MEC standard established by the European Telecommunications Standards Institute (ETSI).

Through the above method, the efficiency of application migration can be improved, the use of network resources and computing resources can be reduced, and data processing efficiency and user experience can be improved.

Figure 2:
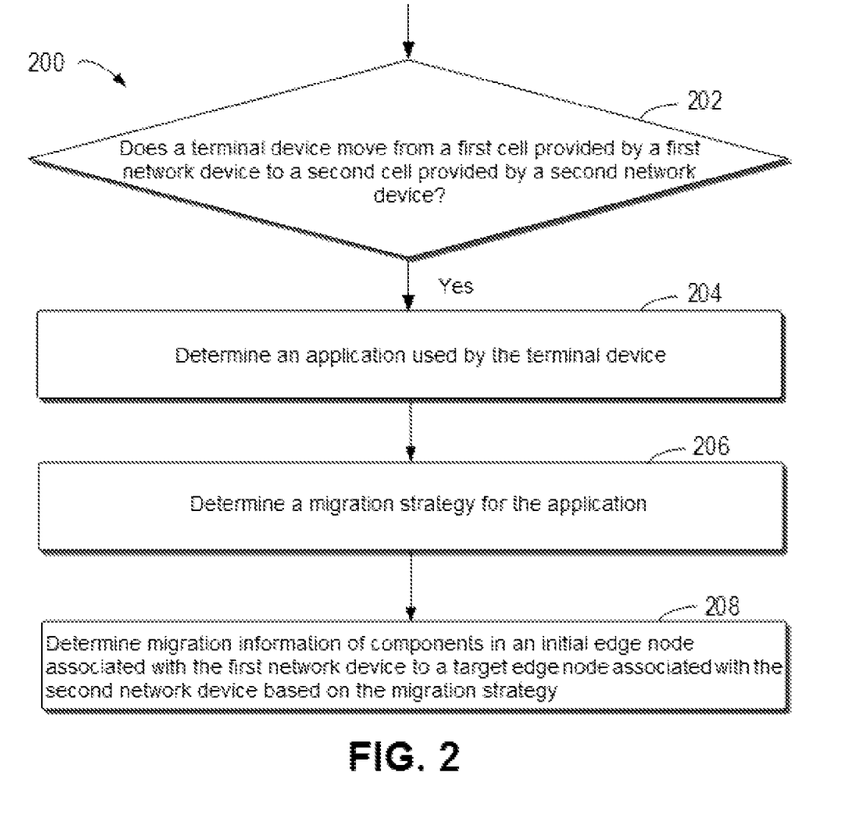
FIG. 2 illustrates a flowchart of method 200 for application migration according to an embodiment of the present disclosure.

FIG. 2 describes a flowchart of example method 200 for application migration according to an embodiment of the present disclosure. Method 200 may be implemented at migration manager 104 in FIG. 1 or any suitable computing device. The embodiment of FIG. 2 is further described below with reference to example system 100 shown in FIG. 1, in which a device and/or a method according to an embodiment of the present disclosure may be implemented.

At block 202, migration manager 104 determines whether terminal device 110 moves from first cell 112 provided by first network device 108 to second cell 116 provided by second network device 114. When terminal device 110 roams from first cell 112 to second cell 116, the above determination needs to be performed.

If migration manager 104 determines that terminal device 110 moves from first cell 112 provided by first network device 108 to second cell 116 provided by second network device 114, migration manager 104 determines application 118 used by terminal device 110 at block 204.

In some embodiments, migration manager 104 receives a message related to the movement of terminal device 110. For example, migration manager 104 receives a notification about the movement from an underlying structure. Then, migration manager 104 acquires a device identifier of terminal device 110 from the message. Then, application 118 used by terminal device 110 is determined based on the device identifier. In this way, an application used by a device can be quickly determined, and the processing efficiency can be improved.

In some embodiments, when terminal device 110 moves from first cell 112 to second cell 116, migration manager 104 may obtain a notification, and may obtain the application used by terminal device 110 in any suitable manner, such as manners defined in the 3GPP 5G standard and the MEC standard. The above examples are only for describing the present disclosure, rather than specifically limiting the present disclosure. Those skilled in the art can determine application 118 used by terminal device 110 in any suitable manner as needed.

In some embodiments, the application is a multi-model parallel application, which is deployed on two levels of edge nodes, such as an edge node co-located with a network device and an edge node co-located with a regional data center. A model parallelization system architecture for edge computing proposed by an embodiment of the present disclosure is described below with reference to FIG. 3.

Figure 3:
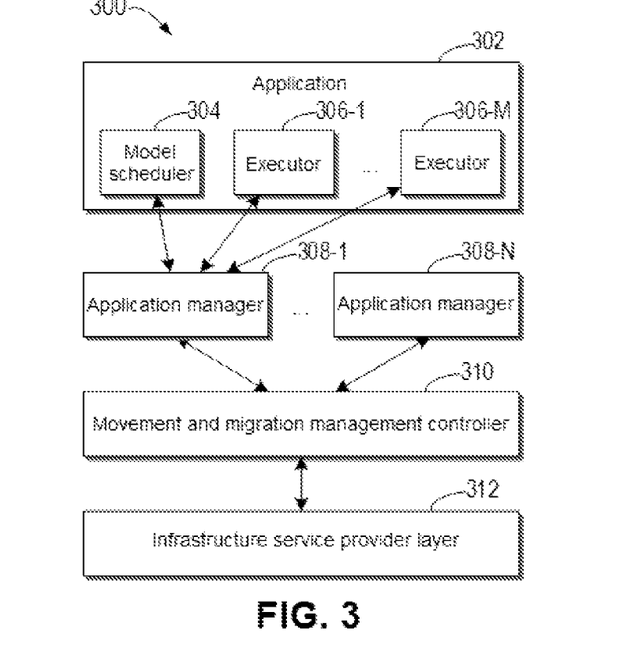
FIG. 3 illustrates a block diagram of a model parallelization system for edge computing according to an embodiment of the present disclosure.

FIG. 3 shows an example block diagram of model parallelization system architecture 300 for edge computing according to an embodiment of the present disclosure. System architecture 300 includes application 302 that uses a machine learning model to perform inference tasks. The application may include model scheduler 304 and executors 306-1, . . . , 306-M, where M is an integer greater than zero. The executors may be collectively referred to as executor 306. System architecture 300 further includes movement and migration management controller (MMMC) 310 for a specific type of application or applications and application managers 308-1, . . . , 308-N for managing different instances of the specific type of application or applications. The application managers are collectively referred to as application manager 308. For example, application manager 308-1 is used to manage application 302, and one or more other application managers up to and including application manager 308-N are used to manage other applications of the same type (such other applications are not shown in FIG. 3), where N is an integer greater than zero. System architecture 300 further includes infrastructure service provider layer 312.

Infrastructure service provider layer 312 is used to provide basic platform services (such as application deployment/lifecycle management and enhanced hardware-aware architecture) and 3GPP 5G/MEC services (such as UPF selection and policy control function) to an upper layer. For example, infrastructure service provider layer 312 may be implemented by using Intel's Open-NESS platform or platforms from other providers.

MMMC 310 corresponds to a specific type of application or applications. Since each type of application or applications usually has a specific migration strategy, a specific computational graph, a specific UPF control policy for selecting a UPF for an input node, and a specific application mobility control policy for a computational node, different types of applications may correspond to different MMMCs. MMMC 310 may obtain a notification from infrastructure service provider layer 312 that a terminal device moves from one cell to another cell.

Each application manager 308 will correspond to a specific application instance under a specific type, and is used to implement instruction and data conversion between the specific application instance and an underlying service. All application managers for the same type of application or applications are all under the control of a single MMMC for that type.

Model scheduler 304 and executor 306 may implement a model parallelization algorithm. In some embodiments, model scheduler 304 may divide models used by an application to obtain an input node and a computing node. Model scheduler 304 may assign a plurality of nodes obtained through the division to corresponding executors 306 for execution. Model scheduler 304 may be implemented as a remote procedure call (RPC) server, and each executor 306 may be implemented as an RPC client terminal. The RPC client terminal of each executor 306 may execute operations of one or more nodes according to a request sent by the RPC server.

In some embodiments, in order to implement the deployment of applications on two levels of edge nodes, executor 306 for executing an input node may be deployed to an edge node co-located with a network device, and executor 306 for executing an computing node may be deployed to an edge node co-located with a regional data center.

In some embodiments, model scheduler 304 may be deployed, for example, to an edge node co-located with a regional data center. Application manager 308 may be deployed, for example, to migration manager 104, for example, as shown in FIG. 1, or deployed to a suitable edge node, for example, an edge node co-located with a regional data center. MMMC 310 may be deployed, for example, to migration manager 104 as shown in FIG. 1. In some embodiments, one or more of application manager 308 and MMMC 310 may be implemented by using the same physical device. The above examples are only for describing the present disclosure, rather than specifically limiting the present disclosure.

Returning to FIG. 2, at block 206, migration manager 104 determines a migration strategy for the application. The migration strategy describes the migration of components of the application in a predetermined scenario corresponding to the application.

In some embodiments, migration manager 104 determines an identifier of application 118. Migration manager 104 determines a migration strategy for application 118 based on the identifier of application 118. In this way, a migration strategy of an application can be quickly and accurately determined, and the determination time can be shortened.

In some embodiments, when terminal device 110 uses application 118, an instance of application 118 will be generated. The generated instance of application 118 will register the corresponding migration strategy in a management table of migration manager 104. Migration manager 104 may find the corresponding migration strategy by using the identifier of the application. The above examples are only for describing the present disclosure, rather than specifically limiting the present disclosure.

At block 208, migration manager 104 determines migration information of components in an initial edge node associated with the first network device to a target edge node associated with the second network device based on the migration strategy. The migration information at least indicates whether the components in the initial edge node are to be migrated to the target edge node. After obtaining the migration information, migration manager 104 will perform a migration process according to the indication of the migration information.

Through the above method, the efficiency of application migration can be improved, the use of network resources and computing resources can be reduced, and data processing efficiency and user experience can be improved.

The schematic diagram of a method for application migration according to an embodiment of the present disclosure has been described above with reference to FIGS. 2 and 3. A schematic diagram of an example environment for application migration for different scenarios according to an embodiment of the present disclosure will be described below with reference to FIGS. 4A-4D. In particular, a process of determining migration information and performing migration according to a migration strategy will be described with reference to FIGS. 4A-4D.

Figure 4A:
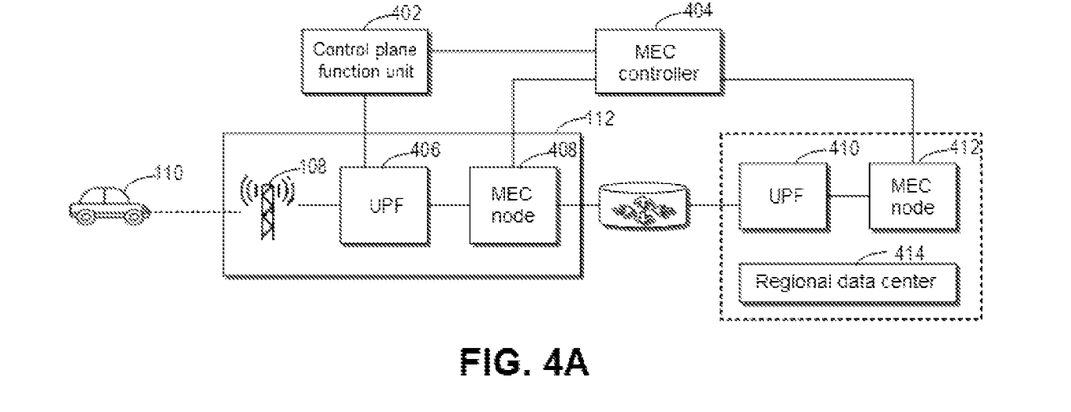
FIG. 4A illustrates a schematic diagram of an example environment for application migration in a first scenario according to an embodiment of the present disclosure.

As shown in FIG. 4A, an example environment includes terminal device 110, network device 108, one or more MEC nodes 408 and UPFs 406 co-located with network device 108, regional data center 414, and one or more MEC nodes 412 and UPFs 410 co-located with regional data center 414. MEC nodes 408 and 412 may be managed by MEC controller 404. In addition, UPFs 406 and 410 may be managed by, for example, control plane function unit 402 in a 5G core network.

MEC controller 404 and MEC nodes 408 and 412 comply with the MEC standard established by the European Telecommunications Standards Institute (ETSI).

For an application used by terminal device 110, an executor for an input node in a computational graph of the application is deployed to MEC node 408 co-located with network device 108, and an executor for a computing node of the application and a model scheduler are deployed to MEC node 412 co-located with regional data center 414. In order to implement traffic routing and orientation, a data path between terminal device 110 and MEC node 408 and a data path between MEC node 408 and MEC node 412 are also established.

In a predetermined scenario of the example environment, terminal device 110 only uses the application in first cell 112. If terminal device 110 moves out of first cell 112, terminal device 110 cannot use the application. Therefore, there is no migration of the application. Therefore, the migration information in the migration strategy for the scenario indicates that there is no need to migrate components of the application. In this way, data for application migration is reduced, the processing efficiency is improved, and the waste of network resources is reduced. Then, MEC controller 404 uses the migration information and does not perform any migration operation.

Figure 4B:
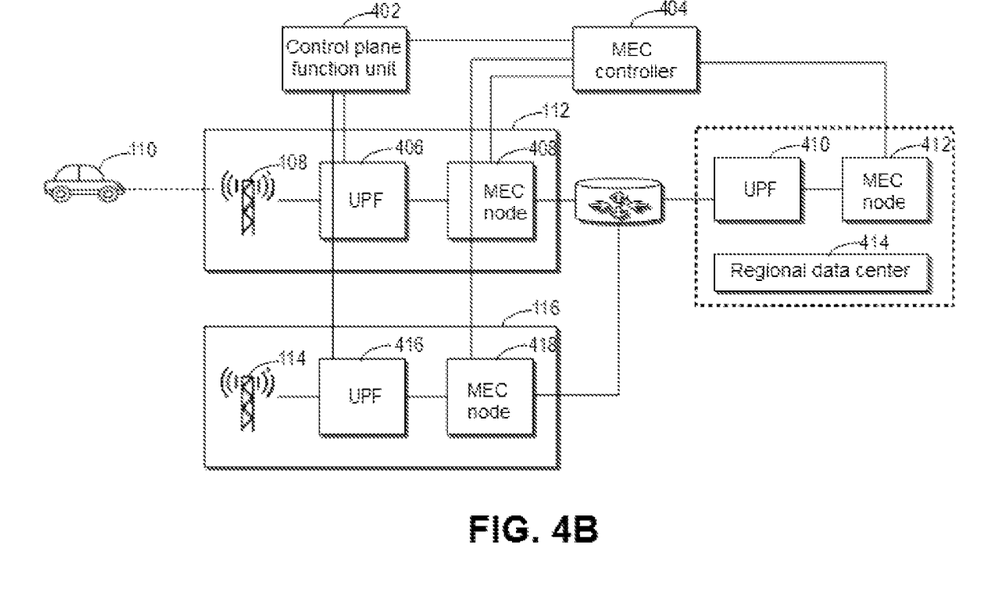
FIG. 4B illustrates a schematic diagram of an example environment for application migration in a second scenario according to an embodiment of the present disclosure.

As shown in FIG. 4B, in the example environment, the same application example may be used for different instances of terminal device 110 in different cells. In addition to various components in FIG. 4A, the example environment also includes network device 114 and one or more MEC nodes 418 and UPFs 416 co-located with network device 114.

MEC node 408 co-located with network device 108 and MEC node 418 co-located with network device 114 are connected to MEC node 412 co-located with the same regional data center 414. Therefore, the same instance of the application may be applied to terminal device 110 on first cell 112 and second cell 116.

Since the computing node executor and the node scheduler of the application are deployed to MEC node 412, when terminal device 110 moves from first cell 112 to second cell 116, there is no need to migrate the computing node executor and the node scheduler. Since the input node executor needs to be deployed to MEC node 418 along with terminal device 110, in this predetermined scenario, the migration information in the migration strategy is to migrate the input node executor in MEC node 408 to MEC node 418. Therefore, based on the migration strategy for the scenario, it may be determined to migrate the input node executor in the MEC node 408 to MEC node 418. In this way, data for application migration is reduced, the processing efficiency is improved, and the waste of network resources is reduced. Then, the input node executor is migrated from MEC node 408 to MEC node 418 according to the acquired migration information.

Figure 4C:
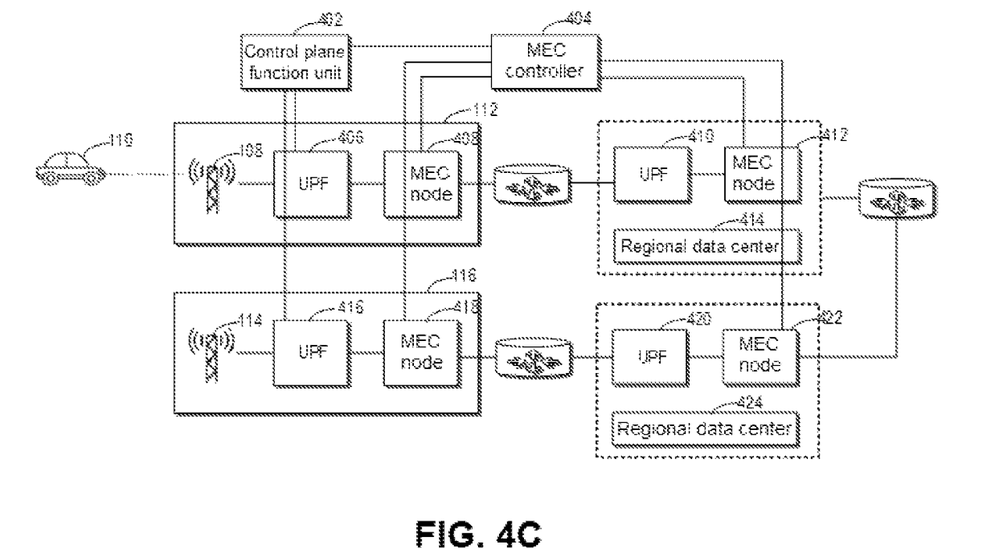
FIG. 4C illustrates a schematic diagram of an example environment for application migration in a third scenario according to an embodiment of the present disclosure.

As shown in FIG. 4C, in the example environment, terminal device 110 uses the same instance of the migrated application in different cells. In addition to the components in FIG. 4B, the example environment also includes regional data center 424 and one or more MEC nodes 422 and UPFs 420 co-located with regional data center 424. MEC node 408 co-located with network device 108 is connected to MEC node 412 co-located with regional data center 414, and MEC node 418 co-located with network device 114 is connected to MEC node 422 co-located with regional data center 424. Therefore, when terminal device 110 moves from first cell 112 to second cell 116, the instances of the application used by terminal device 110 need to be migrated. Since the input node executor of the application is deployed to MEC node 408, the computing node executor and the node scheduler are deployed to MEC node 412. Therefore, when terminal device 110 travels from first cell 112 to second cell 116, the input node executor needs to be migrated from MEC node 408 to MEC node 418, and the computing node executor and the node scheduler need to be migrated from MEC node 412 to MEC node 422. Therefore, in this predetermined scenario, the migration information in the migration strategy is to migrate the input node executor, the computing node executor, and the node scheduler in the initial edge node to the target edge node. Therefore, based on the migration strategy for the scenario, it may be determined to migrate the node scheduler, the input node executor, and the computing node executor in MEC nodes 408 and 412 to MEC nodes 418 and 422 associated with second network device 114. In this way, data for application migration is reduced, the processing efficiency is improved, and the waste of network resources is reduced. In addition, it is also necessary to migrate user context information about the application during use of the application, including state information in the node scheduler. Then, the input node executor, the computing node executor, and the node scheduler are migrated from an initial MEC node to a target MEC node according to the acquired migration information.

Figure 4D:
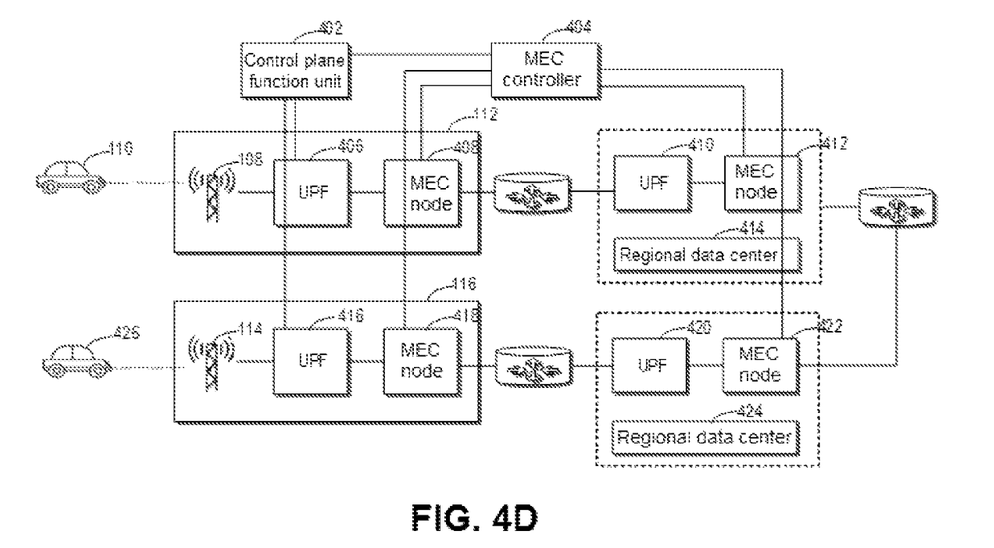
FIG. 4D illustrates a schematic diagram of an example environment for application migration in a fourth scenario according to an embodiment of the present disclosure.

As shown in FIG. 4D, in the example environment, terminal device 110 uses different application instances in different cells. MEC node 408 co-located with network device 108 is connected to MEC node 412 co-located with the same regional data center 414, and MEC node 418 co-located with network device 114 is connected to MEC node 422 co-located with regional data center 424. An instance of an application serving terminal device 110 runs on MEC node 408 and MEC node 412, and another instance of the application serving terminal device 426 runs on MEC node 418 and MEC node 422. Therefore, when terminal device 110 travels from first cell 112 to second cell 116, since there is already an instance of the application, there is no need to migrate instances of the application. At this moment, it is only necessary to migrate the user context information about the application running in MEC node 412, including the state information in the node scheduler. Therefore, based on the migration strategy for the scenario, it may be determined not to migrate components. In this way, data for application migration is reduced, the processing efficiency is improved, and the waste of network resources is reduced. Then, a migration operation for the application is not performed according to the acquired migration information.

Figure 5:
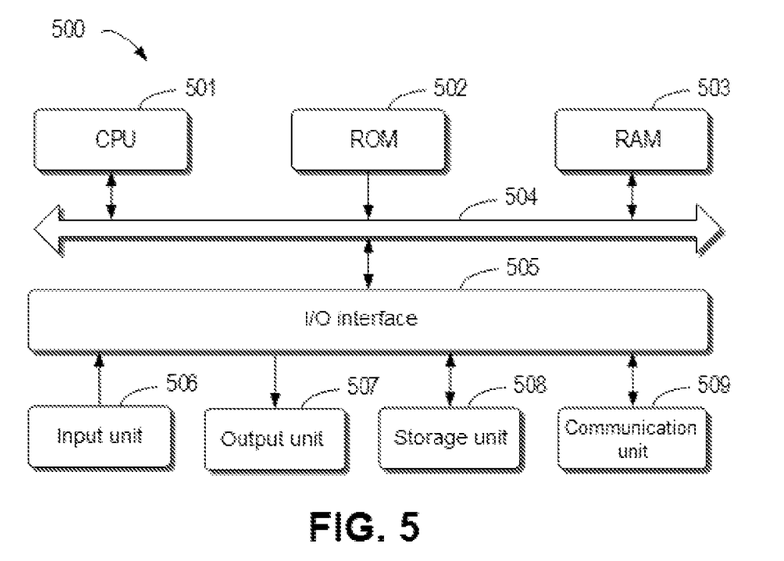
FIG. 5 illustrates a schematic block diagram of example device 500 applicable to implement the embodiments of the present disclosure.

FIG. 5 shows a schematic block diagram of example device 500 that may be used to implement illustrative embodiments of the present disclosure. One or more of migration manager 104 in FIG. 1, MEC controller 404 in FIGS. 4A-4C, and other components may be implemented by device 500. As shown in the figure, device 500 includes a processing unit, illustratively a central processing unit (CPU) 501, that may perform various appropriate actions and processing according to computer program instructions stored in read-only memory (ROM) 502 or computer program instructions loaded from storage unit 508 into random access memory (RAM) 503. In RAM 503, various programs and data required for the operation of device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

Various processes and processing described above, for example, method 200, may be performed by CPU 501. For example, in some embodiments, method 200 may be implemented as a computer software program that is tangibly included in a machine-readable medium, such as storage unit 508. In some embodiments, part or all of the computer program may be loaded and/or installed to device 500 via ROM 502 and/or communication unit 509. When the computer program is loaded into RAM 503 and executed by CPU 501, one or more actions of method 200 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any appropriate combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case involving a remote computer, the remote computer may be connected to a user computer through any kind of networks, including a local area network (LAN) or a wide area network (WAN), or may be connected to an external computer (for example, connected through the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method for application migration, comprising:
determining an application used by a terminal device when it is determined that the terminal device moves from a first cell provided by a first network device to a second cell provided by a second network device;
determining a migration strategy for the application, the migration strategy describing the migration of components of the application in a predetermined scenario corresponding to the application; and
determining migration information of components in an initial edge node associated with the first network device to a target edge node associated with the second network device based on the migration strategy, the migration information at least indicating whether the components in the initial edge node are to be migrated to the target edge node.

2. The method according to claim 1, wherein determining the application used by the terminal device comprises:
receiving a message related to the movement of the terminal device;
acquiring a device identifier of the terminal device from the message; and
determining the application used by the terminal device based on the device identifier.

3. The method according to claim 1, wherein determining the migration strategy comprises:
determining an identifier of the application; and
determining the migration strategy for the application based on the identifier of the application.

4. The method according to claim 1, wherein determining the migration information comprises:
when it is determined that the predetermined scenario indicates that the terminal device only uses the application in a single cell, determining not to migrate the components.

5. The method according to claim 1, wherein determining the migration information comprises:
when it is determined that the predetermined scenario indicates that the terminal device uses the same instance of the application in different cells, determining to migrate an input node executor in the initial edge node to the target edge node.

6. The method according to claim 1, wherein determining the migration information comprises:
when it is determined that the predetermined scenario indicates that the terminal device uses the same instance of the migrated application in different cells, determining to migrate a node scheduler, an input node executor, and a computing node executor in the initial edge node to the target edge node associated with the second network device.

7. The method according to claim 1, wherein determining the migration information comprises:
when it is determined that the predetermined scenario indicates that the terminal device uses different instances of the application in different cells, determining not to migrate the components.

8. An electronic device, comprising:
at least one processor; and
a memory coupled to the at least one processor and having instructions stored thereon, wherein when executed by the at least one processor, the instructions cause the device to perform actions comprising:
determining an application used by a terminal device when it is determined that the terminal device moves from a first cell provided by a first network device to a second cell provided by a second network device;
determining a migration strategy for the application, the migration strategy describing the migration of components of the application in a predetermined scenario corresponding to the application; and
determining migration information of components in an initial edge node associated with the first network device to a target edge node associated with the second network device based on the migration strategy, the migration information at least indicating whether the components in the initial edge node are to be migrated to the target edge node.

9. The device according to claim 8, wherein determining the application used by the terminal device comprises:
receiving a message related to the movement of the terminal device;
acquiring a device identifier of the terminal device from the message; and
determining the application used by the terminal device based on the device identifier.

10. The device according to claim 8, wherein determining the migration strategy comprises:
determining an identifier of the application; and
determining the migration strategy for the application based on the identifier of the application.

11. The device according to claim 8, wherein determining the migration information comprises:
when it is determined that the predetermined scenario indicates that the terminal device only uses the application in a single cell, determining not to migrate the components.

12. The device according to claim 8, wherein determining the migration information comprises:
when it is determined that the predetermined scenario indicates that the terminal device uses the same instance of the application in different cells, determining to migrate an input node executor in the initial edge node to the target edge node.

13. The device according to claim 8, wherein determining the migration information comprises:
when it is determined that the predetermined scenario indicates that the terminal device uses the same instance of the migrated application in different cells, determining to migrate a node scheduler, an input node executor, and a computing node executor in the initial edge node to the target edge node associated with the second network device.

14. The device according to claim 8, wherein determining the migration information comprises:
when it is determined that the predetermined scenario indicates that the terminal device uses different instances of the application in different cells, determining not to migrate the components.

15. A computer program product tangibly stored on a nonvolatile computer-readable medium and comprising machine-executable instructions, wherein when executed, the machine-executable instructions cause a machine to perform steps of a method for application migration, the method comprising:
determining an application used by a terminal device when it is determined that the terminal device moves from a first cell provided by a first network device to a second cell provided by a second network device;

determining a migration strategy for the application, the migration strategy describing the migration of components of the application in a predetermined scenario corresponding to the application; and determining migration information of components in an initial edge node associated with the first network device to a target edge node associated with the second network device based on the migration strategy, the migration information at least indicating whether the components in the initial edge node are to be migrated to the target edge node.

16. The computer program product according to claim 15, wherein determining the application used by the terminal device comprises:

receiving a message related to the movement of the terminal device;

acquiring a device identifier of the terminal device from the message; and determining the application used by the terminal device based on the device identifier.

17. The computer program product according to claim 15, wherein determining the migration strategy comprises:

determining an identifier of the application; and determining the migration strategy for the application based on the identifier of the application.

18. The computer program product according to claim 15, wherein determining the migration information comprises:

when it is determined that the predetermined scenario indicates that the terminal device only uses the application in a single cell, determining not to migrate the components.

19. The computer program product according to claim 15, wherein determining the migration information comprises:

when it is determined that the predetermined scenario indicates that the terminal device uses the same instance of the application in different cells, determining to migrate an input node executor in the initial edge node to the target edge node.

20. The computer program product according to claim 15, wherein determining the migration information comprises:

when it is determined that the predetermined scenario indicates that the terminal device uses the same instance of the migrated application in different cells, determining to migrate a node scheduler, an input node executor, and a computing node executor in the initial edge node to the target edge node associated with the second network device.

\* \* \* \* \*